United States Patent [19]
Loichinger et al.

[11] Patent Number: 6,032,751
[45] Date of Patent: Mar. 7, 2000

[54] ELECTROMECHANICAL CROSS-DRIVE STEERING TRANSMISSION FOR TRACKLAYING VEHICLES

[75] Inventors: Walter Loichinger, Friedrichshafen; Johannes Sorg, Ravensburg, both of Germany

[73] Assignee: ZF Friedrichshafen AG, Friedrichshafen, Germany

[21] Appl. No.: 08/952,759

[22] PCT Filed: Jun. 11, 1996

[86] PCT No.: PCT/EP96/02524

§ 371 Date: Nov. 18, 1997

§ 102(e) Date: Nov. 18, 1997

[87] PCT Pub. No.: WO97/00190

PCT Pub. Date: Jan. 3, 1997

[30] Foreign Application Priority Data

Jun. 16, 1995 [DE] Germany ............................ 195 21 795

[51] Int. Cl.[7] .................................................. B62D 11/02
[52] U.S. Cl. .......................... 180/6.7; 180/9.44; 701/41; 701/42; 701/50
[58] Field of Search ...................... 180/400, 402, 180/443, 446, 168, 6.2, 6.7, 9.44, 421, 6.66; 280/771, 774; 364/142, 148, 166, 167.01, 180, 188, 190; 318/447, 456, 461, 465, 466, 468, 469, 489; 701/41, 42, 43, 44, 50

[56] References Cited

U.S. PATENT DOCUMENTS 5,569,109  10/1996  Okada ........................................ 475/28

FOREIGN PATENT DOCUMENTS

1 176 002    8/1964   Germany .
36 19 055 C2 12/1966  Germany .
43 41 202 A1  6/1995  Germany .

*Primary Examiner*—Christopher P. Schwartz
*Assistant Examiner*—C. T. Bartz
*Attorney, Agent, or Firm*—Davis and Bujold

[57] ABSTRACT

A cross-drive steering transmission serves for steering a tracklaying vehicle and has the following characteristics: at least two fixed mechanical reduction gears which act according to at least two turning radii; in addition an automatic steering radius switching mechanism is provided between the fixed reduction gears (fixed steering radii) and a device for the driver inputting a desired steering radius. Also provided is a control unit which, depending on the steering radius input by the driver, switches among a plurality of the fixed steering radii and approximates the desired steering radius.

1 Claim, 13 Drawing Sheets

| NO. | Engine Speed | Parking Brake | Angle Steering Wheel | Gear | Speed | Compare n_Ab_Steer with n_An_Stab | Disconnection or Down Charge Steering Transm. |
|---|---|---|---|---|---|---|---|
| 1.1 | X | X | < - alpha_1 | <> N | < v_1 | n_Ab_Steer < n_An_Stab_li | Down Charge Steering Non-Slip Range for Max Time > t1: Disconnection |
| 1.2 | X | X | > - alpha_1 | <> N | < v_1 | n_Ab_Steer < n_Ab_Stab_re | |
| 2 | X | X | X | N > 2.5 s | < v_1 | X | Disconnection |
| 3.1 | X | 1 | < - alpha_1 | X | < v_1 | X | Disconnection |
| 3.2 | X | 1 | > - alpha_1 | X | < v_1 | X | |
| 4.1 | < n_1 | X | < - alpha_1 | X | < v_1 | X | Disconnection |
| 4.2 | < n_1 | X | > - alpha_1 | X | < _v1 | X | |

1: ON
X: Not relevant
0: OFF n_1 = 550 1/min
v_1 = 6 km/h

Disconnection:
M1 AND M2 AND M3 = 0
M0 = 1

| No. | Gear | Angle Steering Wheel | Speed | Clearing Steering Transm. Disconnection |
|---|---|---|---|---|
| 1 | <> N | N |  | 1 |
| 2 |  |  | > v_2 | 1 |
| 3 | <> N | N | > v_2 | 1 |

1: ON    v_2 = 8 km/h

ELECTROMECHANICAL CROSS-DRIVE STEERING TRANSMISSION FOR TRACKLAYING VEHICLES

The invention concerns a cross-drive steering transmission for a tracklaying vehicle, in particular a cross-drive steering transmission having several fixed reduction gears.

For the control of tracklaying vehicles, a difference of speed of the two driving chains is produced, whereby a turning radius appears in which the ratio of the inner radius to the outer radius corresponds to the speed ratio of the inner to the outer chain. To produce said speed difference, cross-drive steering transmissions are used which superimpose the designed speed difference, between right and left chains, to the actual propulsion.

The cross-drive steering transmissions, for presently known tracklaying vehicles, can be divided in two categories:

a) mechanical steering transmission with fixed reduction gears which, in addition, partly have at their disposal a small infinitely variable range for large radii; and b) hydrostatic or hydrodynamic steering transmission structures which work infinitely variably over the entire, or at least a large, range.

The mechanical steering transmission advantageously stands out by its low cost, high efficiency, simple design and short reaction time, but has the disadvantage of possessing no infinitely variable range, or only a very small one, which results in stiff demands on the driver and relatively expensive safety devices against torque overloads.

The hydrostatic or hydrodynamic steering transmissions, as result of their large, infinitely variable steering range, impose only slight demands on the driver and can be easily secured against torque overloads, but due to the complex design, the costs are elevated, the efficiency is low and the reaction time long.

DE-A 36 19 055 has disclosed a mechanical cross-drive steering transmission with three radius ranges. Said transmission is comprised of a partial hydrostatic and a partial mechanical transmission. A zero shaft of the steering transmission cooperates with summarizing gears of the main transmission. In a first radius range, the partial hydrostatic transmission is exclusively active, in a second radius range the partial mechanical transmission is additionally active and in a third fixed radius the partial mechanical transmission is exclusively active.

The problem to be solved by the invention is to develop a mechanical cross-drive transmission so that, on one hand, the above described advantages are retained and, on the other, a large infinitely variable steering range results.

The problem is solved by the features of claim 1.

Accordingly, a conventionally designed mechanical steering transmission is used which has an automatic steering radius switching means and a control wherein, according to the driver's steering radius input, switching is automatically produced by the control between the existing fixed steering radii in such a manner that the desired arc (with a corresponding radius) is approximated by a plurality of arc segments (with fixed radii).

The invention is described in more detail in the figures with the aid of an embodiment having one mechanical three-radii steering transmission. There is, in addition, represented what follows. In the drawings.

Figure 1:
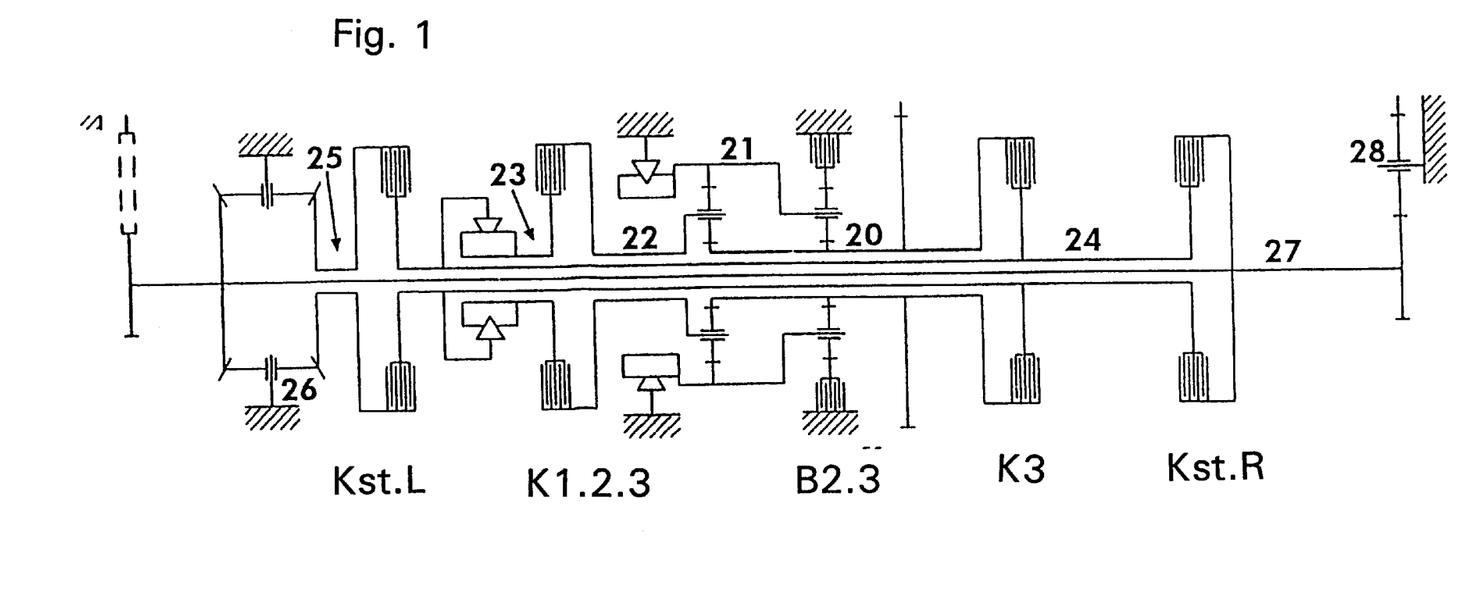
FIG. 1 is a gear diagram of a steering transmission.

FIG. 1 shows a gear diagram of the steering transmission as an example. The steering transmission is comprised essentially of a conventional, primarily driven three-radii steering transmission with three fixed radius reduction gears and an infinitely variable radius range for large steering radii. The infinitely variable radius is obtained by driven slippage in the clutch KR1/2/3 and controlled by a mechanically actuated, hydraulic steering control piston.

Figure 2:
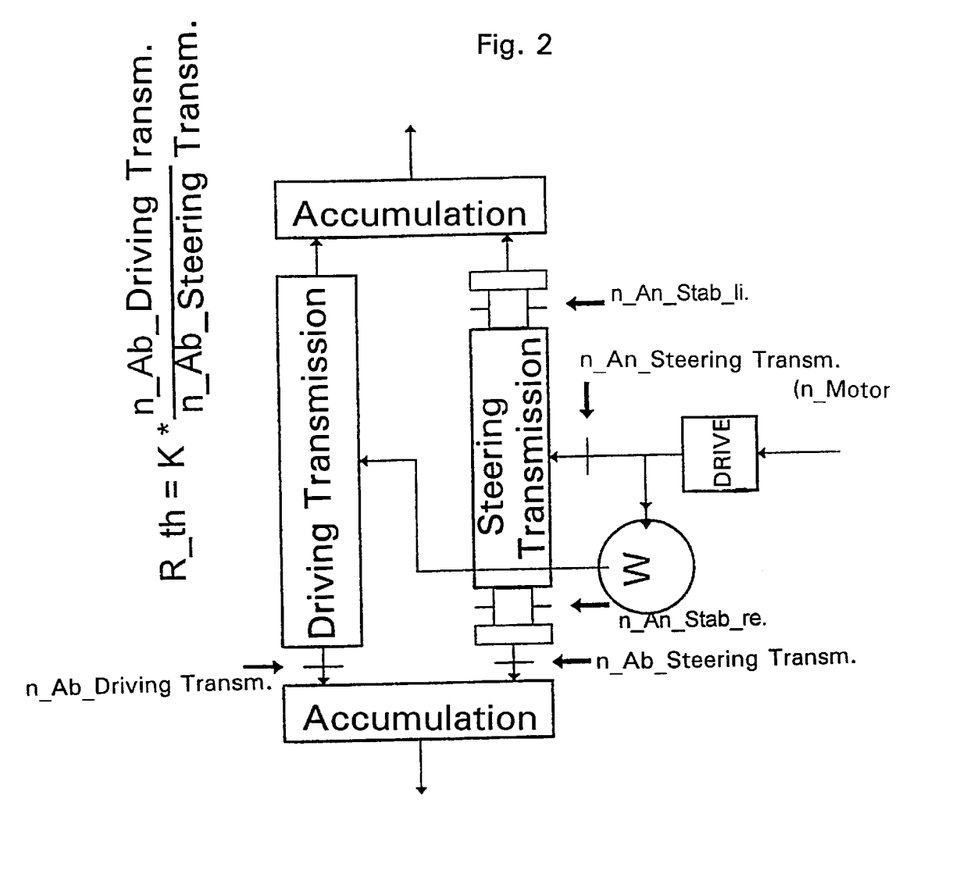
FIG. 2 is a diagram of the tracklaying vehicle transmission.

FIG. 2 shows the diagram of the tracklaying transmission. Said steering transmission has been enlarged and has one speed sensor, respectively, on the steering transmission input, on the input shaft for the stabilizing clutches to the left and right, and on the steering transmission output for measuring the corresponding speeds.

Figure 3:
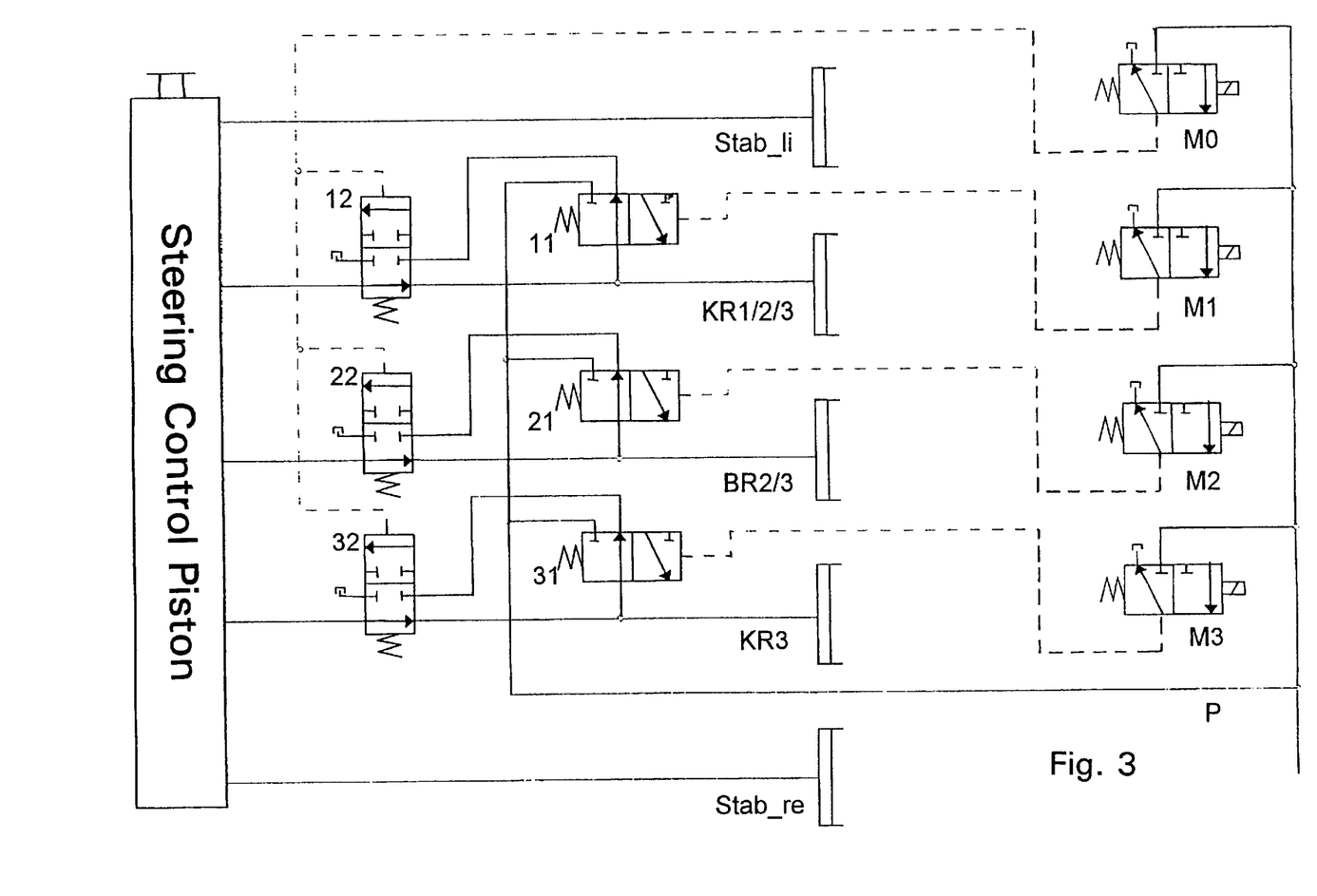
FIG. 3 is a hydraulic diagram.

FIG. 3 shows a hydraulic diagram based on the system. The control of the steering transmission clutches KR1/2/3 and K3 and of the brake BRa/3 has been expanded by the solenoid valves M0, M1, M2 and M3 and by the control valves No. 11, 21, 31, 12, 22, 32. A rotation angle transmitter is installed, fastened to the transmission, upon the actuating shaft for the steering position transmitter for measuring the steering gear angle (driver's wish).

Figure 4:
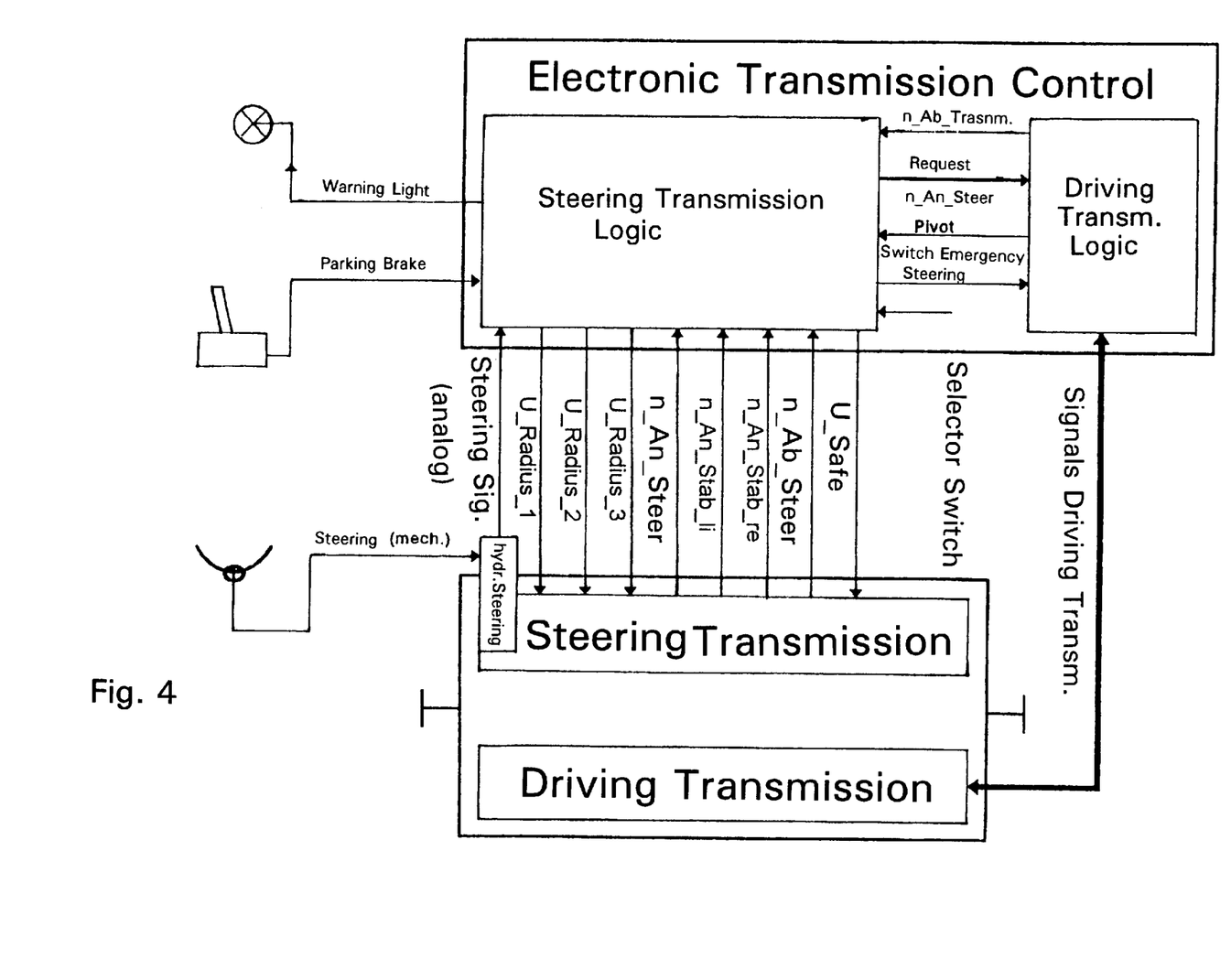
FIG. 4 is an operation diagram.

FIG. 4 shows an operation diagram of the electronic transmission control. Relative to the system this has been expanded, according to hardware and software, by the operation periphery "steering transmission logic." The appertaining hardware and the software has the function of processing the electric input signals issuing from the steering transmission or from the periphery and from the "driving transmission logic."

Figure 5:
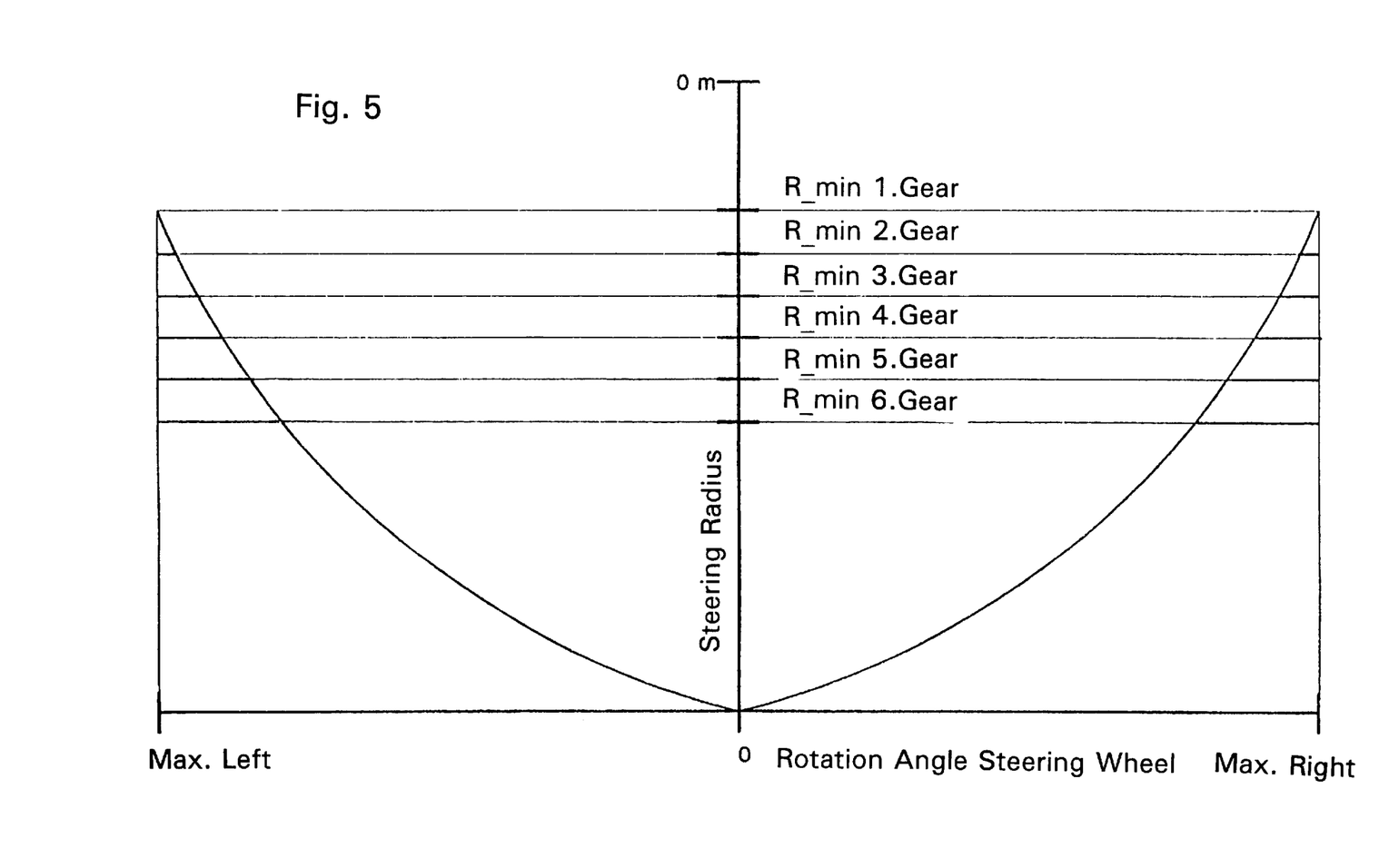
FIG. 5 shows steering radius =f (rotation angle on the steering gear)

FIG. 5 shows the functional connection between the rotation angle on the steering wheel and the steering radius. The nominal turning radius of the driver is continuously communicated to the electronic control via the rotation angle transmitter on the actuating shaft of the steering control piston. From said information the position of the nominal turning radius, relative to the fixed radii made available by the steering transmission, is calculated and the control strategy is thus determined.

Herebelow are described the different steering conditions:

Straight-ahead coasting.

For the straight-ahead coasting, the stabilizing clutches $stab_{13}$ li and stab__re (FIG. 3) are controlled by the hydraulic steering control piston. Thereby a straight ahead driving is forced even under differing driving resistances. To ensure a quick steering reaction, the clutch KR1/2/3 is likewise pulse-width modulated by the solenoid valve M1 and the valve 11 with a corresponding pulse width so that a pressure of about 0.8 to 1.0 bar appears.

Analog infinitely variable steering range.

Figure 6:
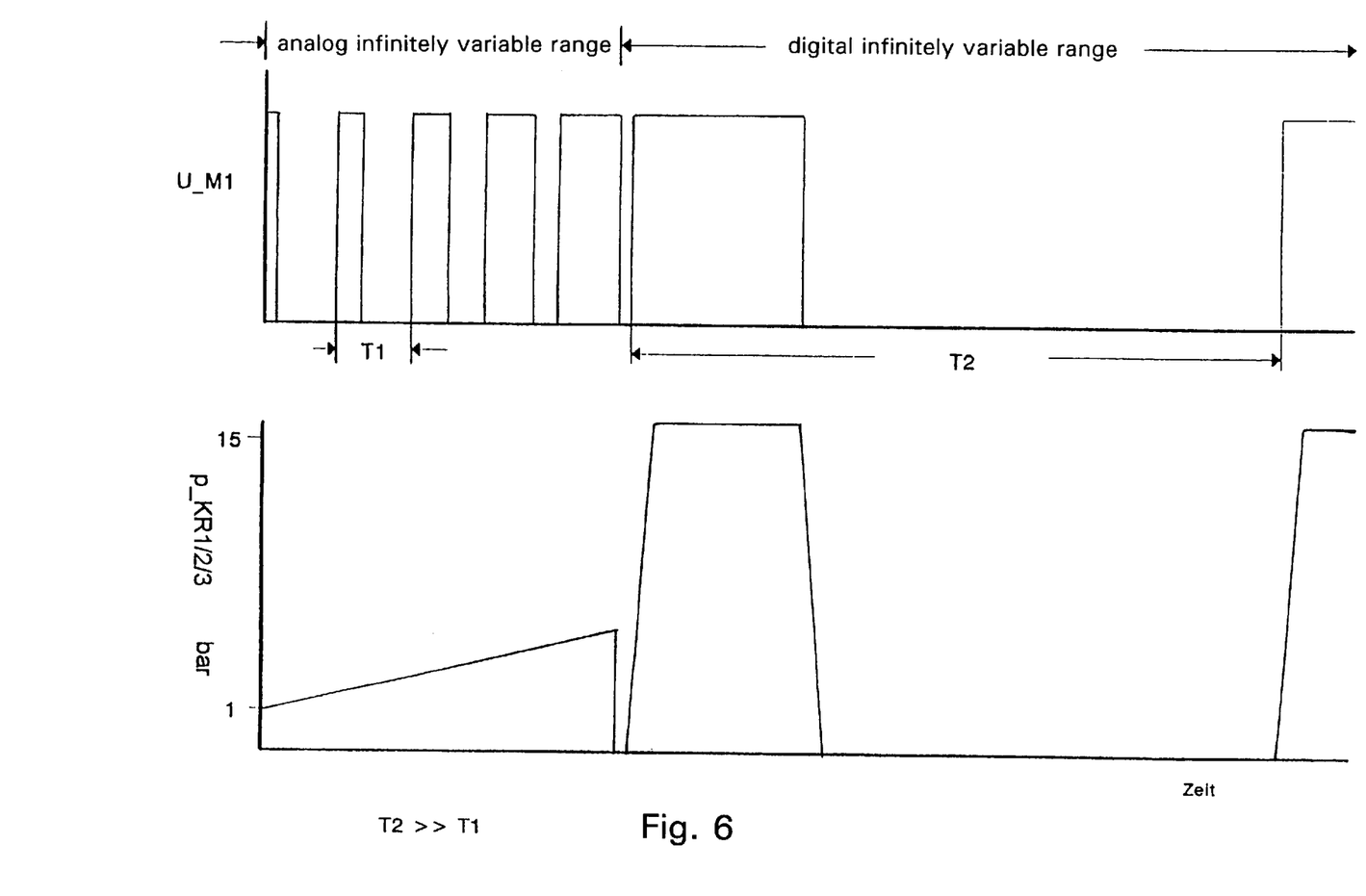
FIG. 6 is a digital/analog change-over range.
Figure 7:
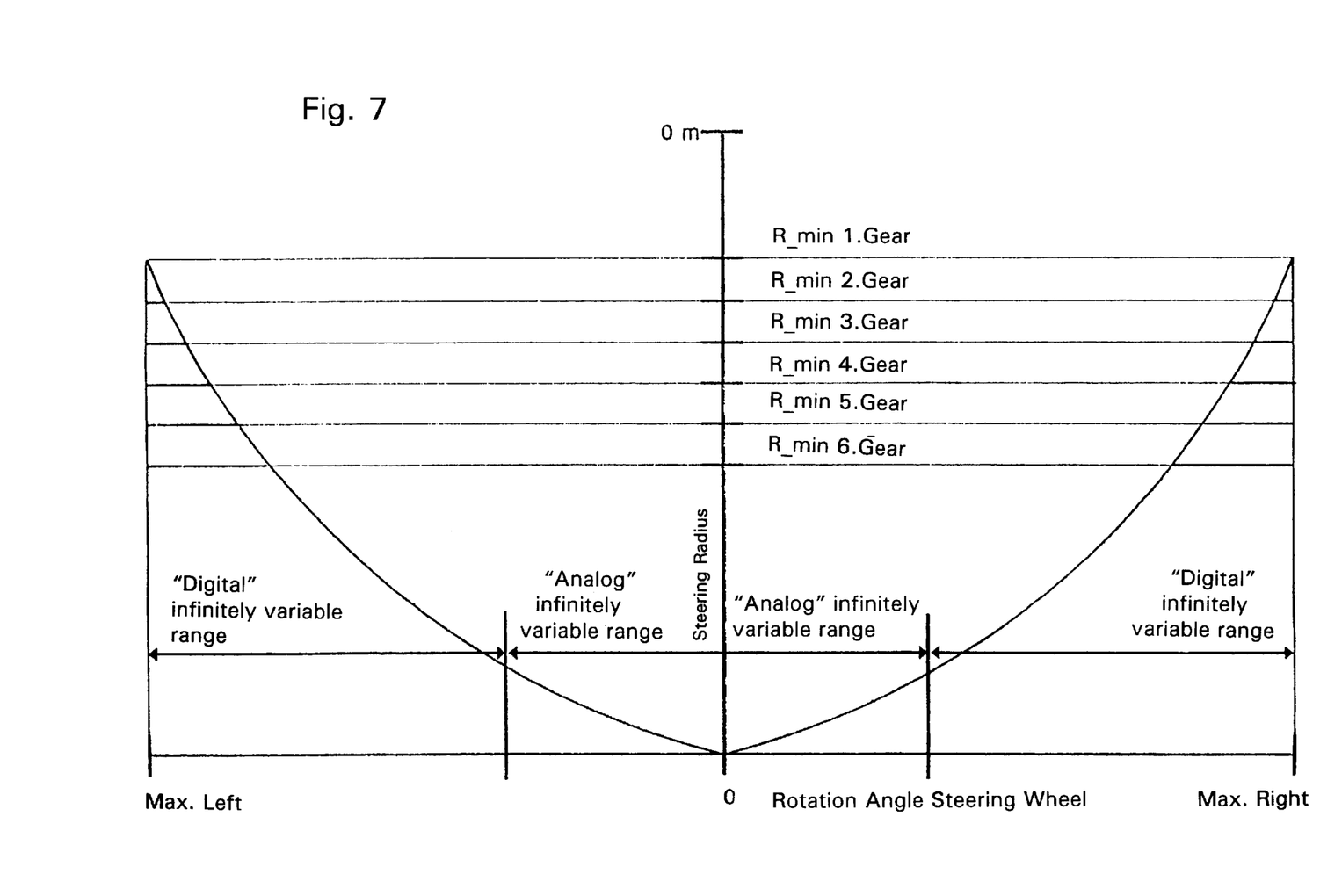
FIG. 7 is a break down of steering angle.

The clutch KR1/2/3 is thermally designed so that it can generate, with slippage, an infinitely variable range within certain limits. If the desired turning radius is within this range, the pressure of the clutch KR1/2/3, depending on the clutch differential speed, is raised by pulse-width modulation within the admissible pressure limits until the nominal turning radius corresponds to the actual turning radius—measured by the output speed of the steering transmission and of the output speed of the driving transmission. This is shown in FIGS. 6 and 7.

Digital infinitely variable steering range.

Figure 8:
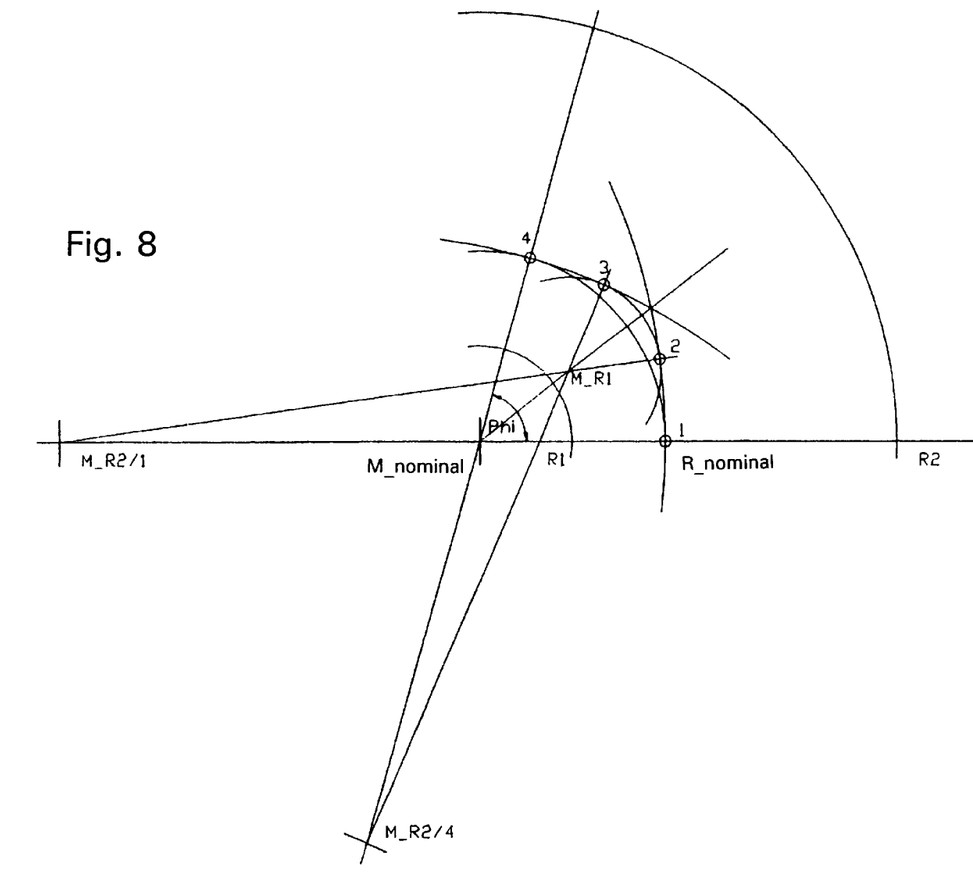
FIGS. 8 and 9 show steering strategy.
Figure 9:
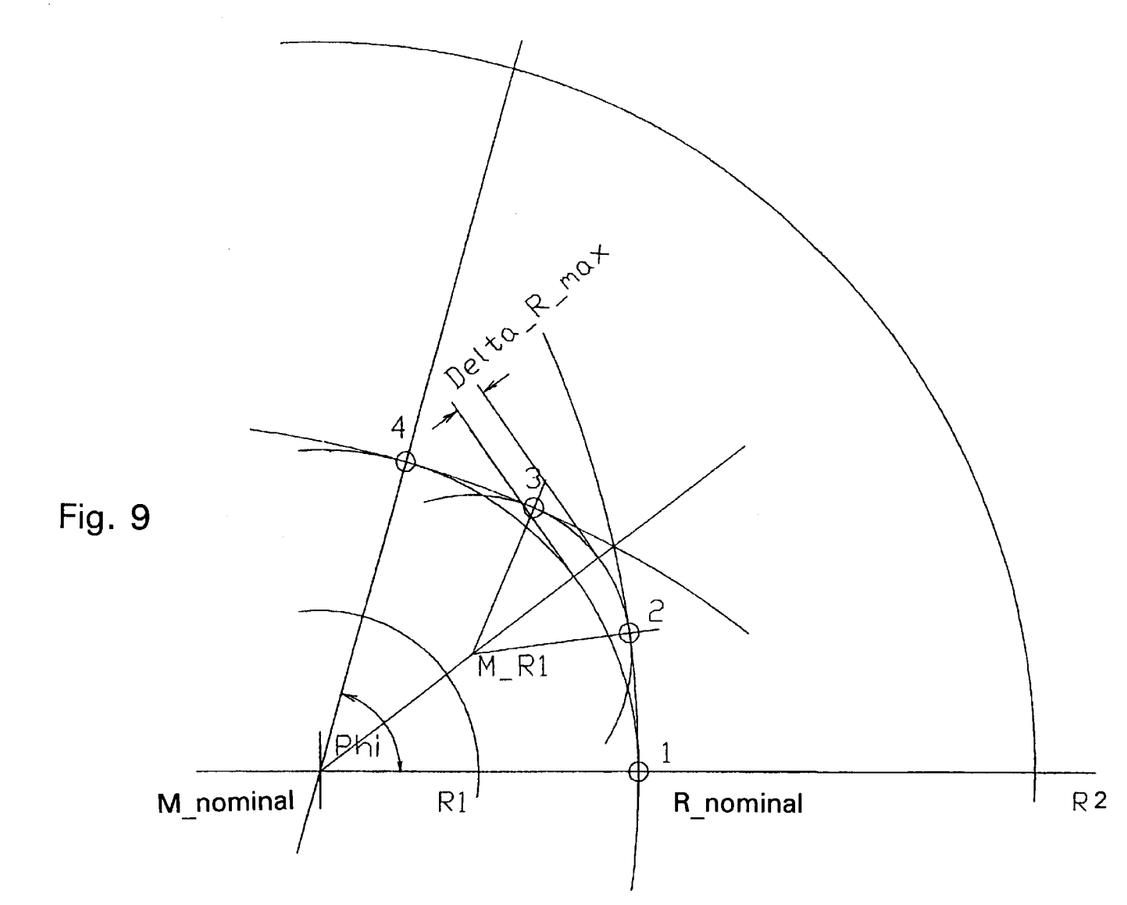
Figure 10:
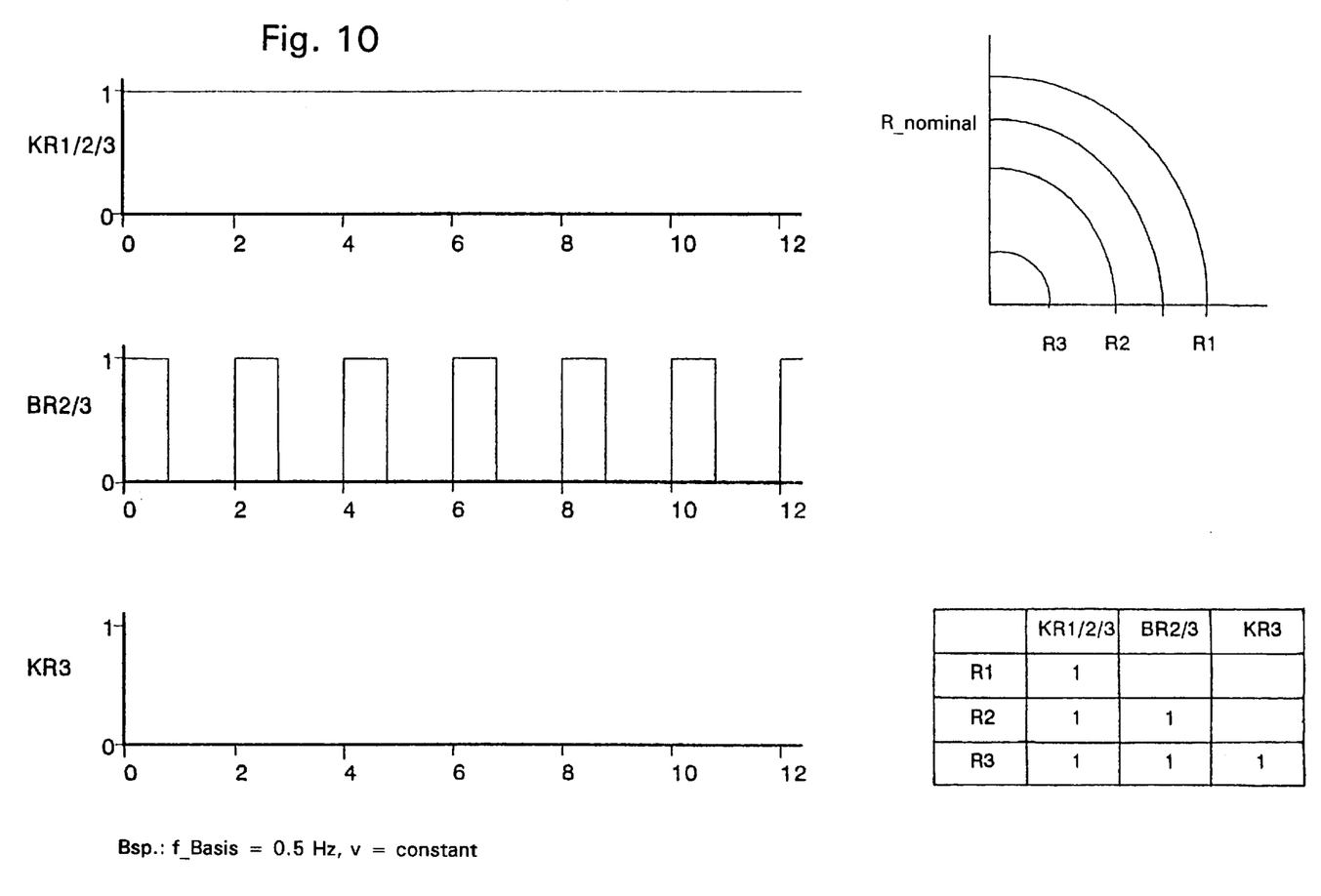
FIG. 10 shows cornering.

If the desired turning radius lies upon a smaller radius than obtainable by the analog infinitely variable steering range, the following steering strategy is applied. From the information of the desired turning radius and of the fixed radii made available to the steering transmission, the electronic control calculates with which partial turning radii from the adjacent fixed radii can be obtained the desired turning radius with the smallest admissible preset turning radius divergence. Such approximation is shown in FIGS. 8 and 9. The tracklaying vehicle must here travel a turning radius which is between the fixed radii R1 and R2 made available by the steering transmission beginning at point 1 with the radius R_nominal around the central point M_nominal wherein the maximum divergence from desired radius, delta_R_max, may not be exceeded. The electronic control now calculates for the maximum admissible turning radius divergence, delta_R_max, the road portions for the fixed radii of the steering transmission and controls the corresponding steering transmission clutches or brakes. The fixed radii are here opened from the equation R_th=K*n_Ab_driving transm./n_Ab_steering transm. Since the ratio n_Ab_driving transm./n_Ab_steering transm. and therewith the theoretical fixed radius can change as a result of an open lock-up clutch, the slippage measured at the beginning of the road interval in the driven speed of the driving transmission over the distance from point 1 to point 4 is assumed as constant (FIG. 10).

Figure 11:
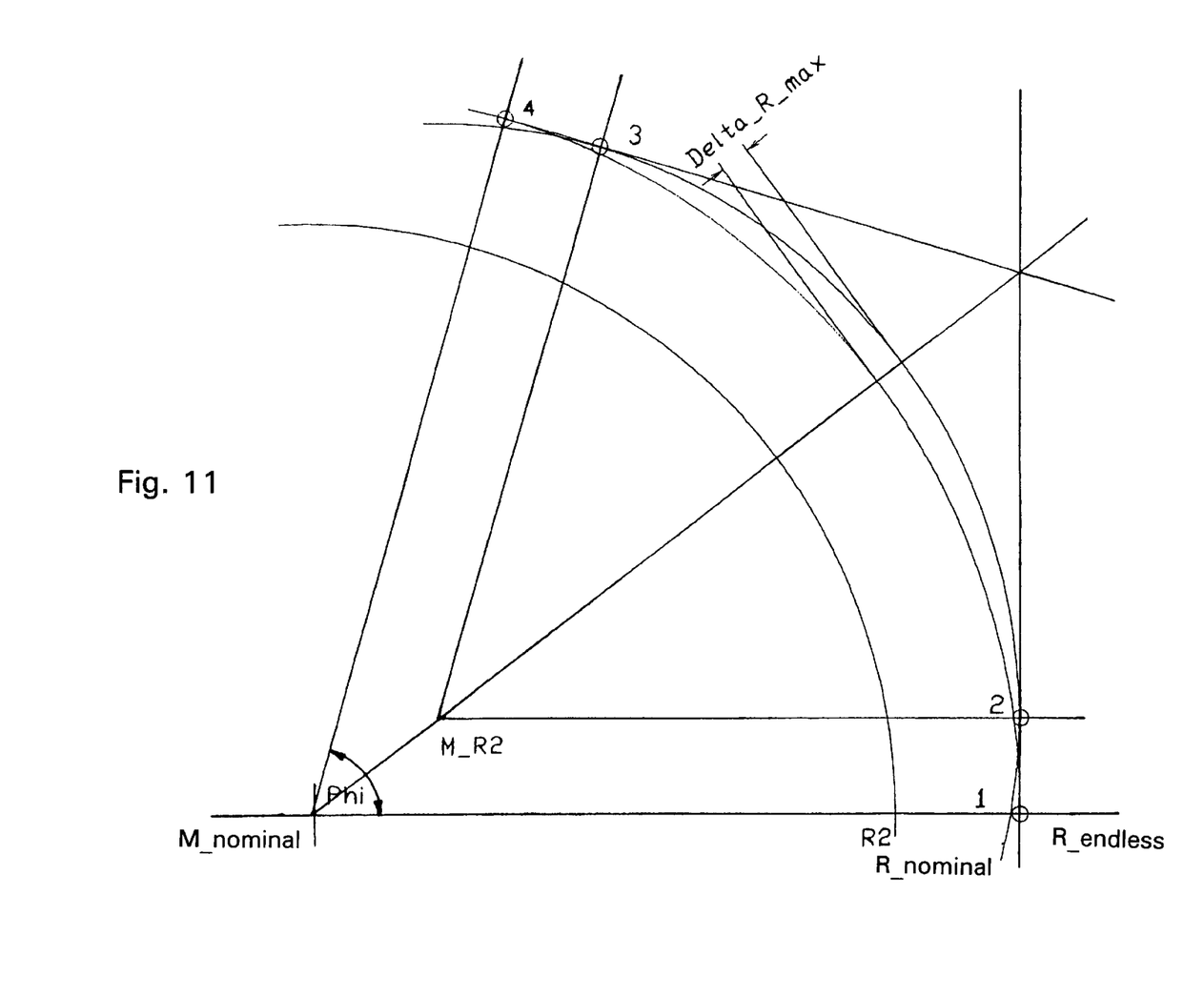
FIG. 11 shows steering strategy.

This strategy is also applied in cases where the nominal turning radius is smaller than the turning radius attainable, via the analog process, and larger than the largest fixed turning radius, as shown in FIG. 11.

The maximum turning radius divergence is a function of the switching frequency of the steering transmission clutches. The minimum attainable turning radius divergence, delta_R_max, is limited by the thermal clutch stress of the steering transmission. This means, in turn, that the switching frequency of the clutches must be limited so that they lie within the limits of the switching frequency, as is at presently customary in manual control.

In the case of a small desired turning radii, it can occur, especially during the coasting operation with an open lock-up clutch, that engine speed and therewith the steering transmission input speed are too low in proportion to the mechanical transmission driven speed to accomplish the desired turning radius. In this case, the steering transmission control requests, with the signal "request n_An_steer" in the driving transmission control, a closure of the lock-clutch or a down-shift in the driving transmission (see FIG. 4).

Turning around the vertical axle (pivot).

During the driving manoeuvre pivot, the digital range is disconnected, since there is no cross-driving speed from the driving transmission. That is, the steering clutches are controlled conventionally by the steering control piston. An infinitely variable rotating speed of the vehicle, via the steering wheel input, is thus available only in the analog range.

In order to provide a security device, in case of eventual electrical interruptions, the control system is designed so that parallel to the electronic control of the steering transmission clutches, the hydraulic steering control piston is mechanically controlled along and by the valves 12, 22 and 32, which are switched by the solenoid valve M0, is separated from the steering transmission clutches. It is thus ensured that, in case of electric interruption due to disconnection of solenoid valve M0, control of the steering transmission is automatically assumed by the hydraulic steering control piston. The electronic control, in turn, is designed so that it checks itself continuously by plausibility criteria (FIG. 3).

In case of interruptions in the electronic transmission control, the signal "switch emergency steering" with the electronic driving transmission control requests a brief opening of the lock-up clutch in order to minimize an eventual turning radius jump during the switching to the emergency steering operation (FIG. 4).

Figure 12:
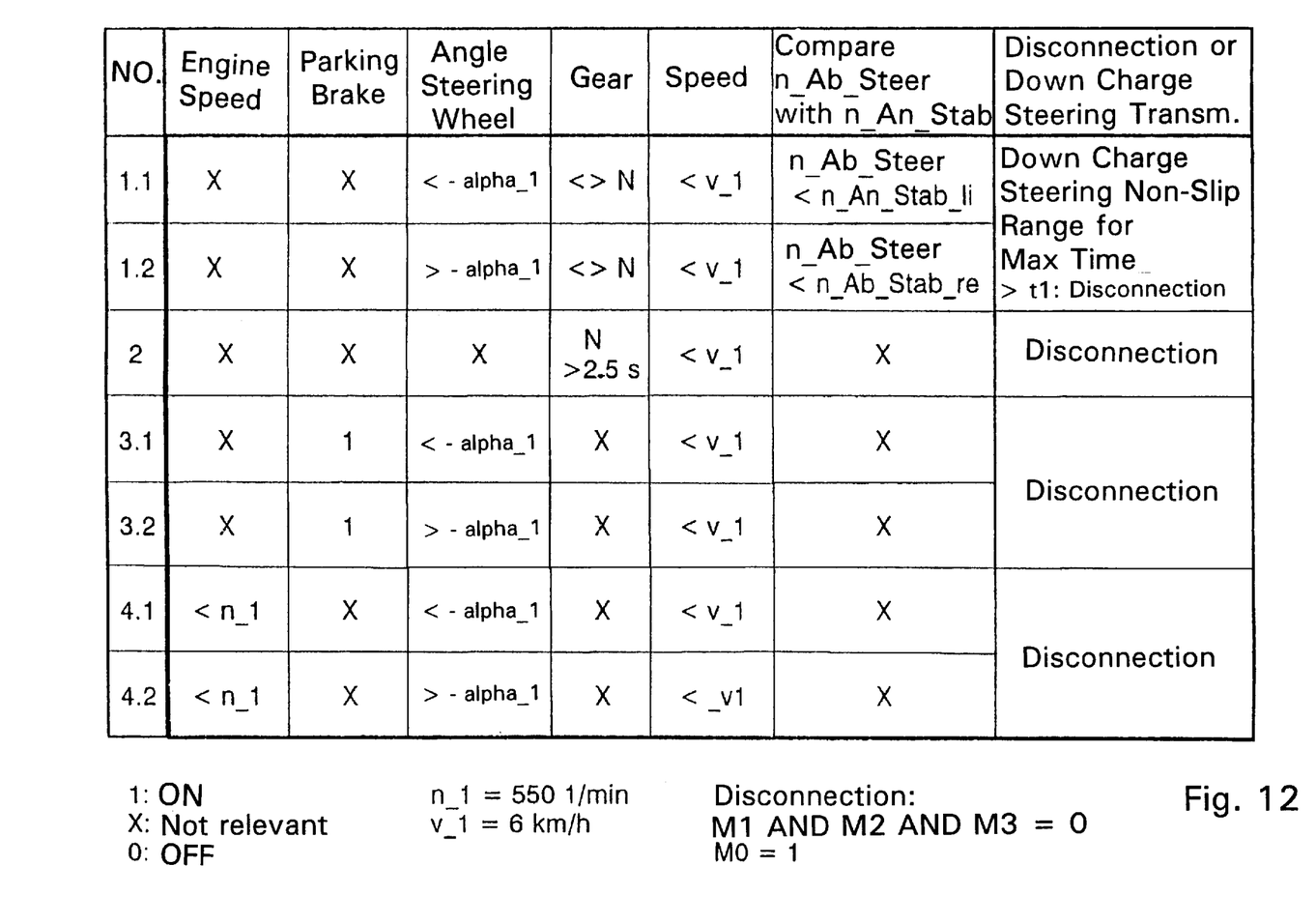
FIG. 12 shows the steering transmission disconnection conditions.

An overload of the steering transmission is prevented by designing the clutches of the steering transmission so that when a torque overload of the steering transmission occurs, the corresponding stabilizing clutch slips. At low speeds—at which the rotation point theoretically can lie between the chains and overloads can occur on account of very high turning resistances—said stabilizing clutches are continuously checked for slippage. If slippage is detected, the electronic control of the steering transmission first switches to a non-slip range so that, in the fixed driven vehicle, the torque first remains on the chains. After a strictly adjusted time has elapsed, the steering transmission is disconnected by the steering transmission control, by control of solenoid valve M0, and a stress-free engagement of the solenoid valves M1, M2 and M3. A corresponding representation of the disconnection conditions is shown in FIG. 12. The steering wheel angle "alpha_1" refers to a steering wheel angle which ensures that the working range of the steering transmission is in the permanent non-slip range. The disconnection conditions, shown in FIG. 12, are steering transmission security devices to be interpreted as AND linkage of the different input parameters. By the "speed" input parameter, it is ensured that the security devices are switched to "stand-by" only at low speeds at which the steering transmission can be fundamentally exposed to a danger of overload. For considerations of general security, the steering transmission likewise is disconnected, in the neutral position of the selector switch, for the driving transmission after about 2.5 seconds has elapsed. If the driver drives without control with an engaged parking brake, the steering transmission is also disconnected when crossing the steering wheel angle "alpha_1." Since steering transmissions are primarily driven directly by the engine, the engine can be stalled with actuated steering during which the chains block in the case of panic braking. This can be prevented by disconnecting the steering transmission when driving below a specific engine speed "n_1."

Figure 13:
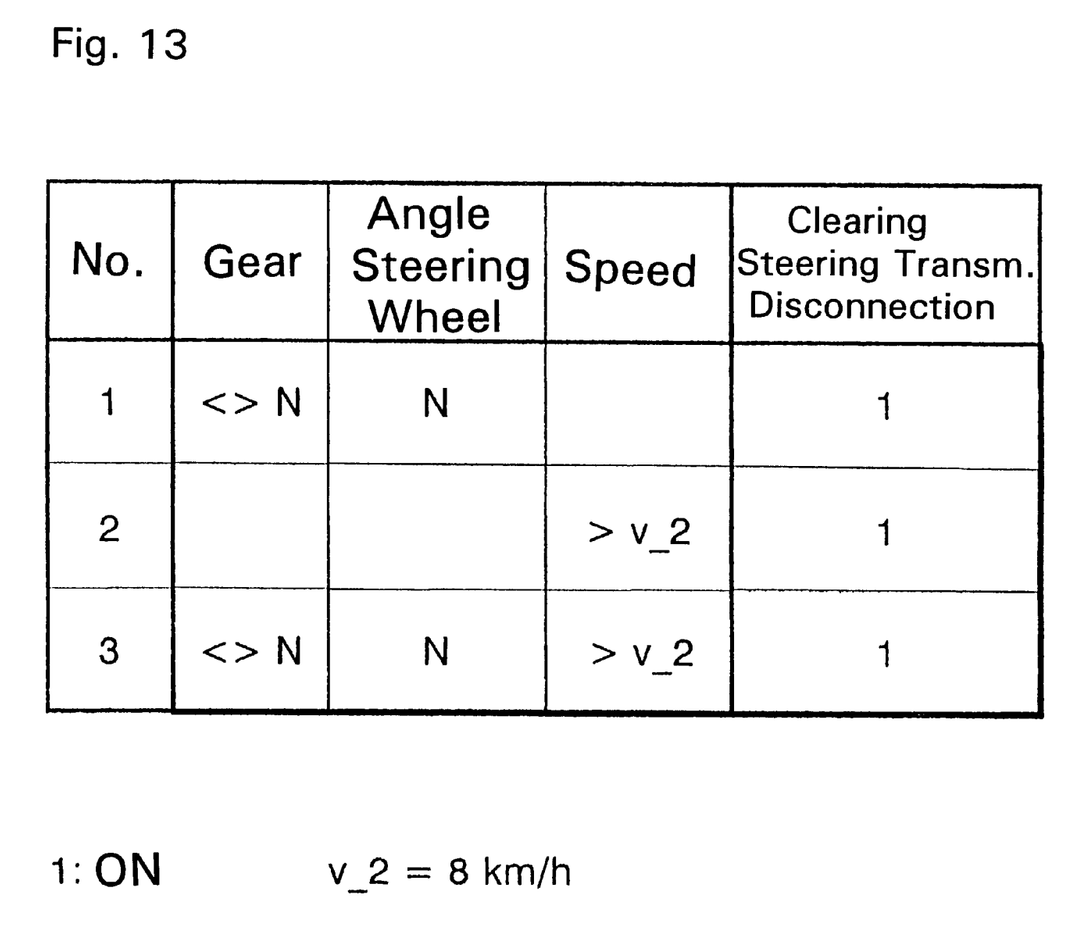
FIG. 13 shows the steering transmission protection "reset" condition.

FIG. 13 shows the reset conditions of the steering transmission protection which takes place depending on the position of the gear selector lever, of the steering wheel position and of the driving speed. With the input speed parameter, in any case it is ensured that the steering transmission, when exceeding a specific vehicle speed "v_2", is switched on.

According to the invention, a cross-drive steering transmission for steering a tracklaying vehicle thus contains at least two fixed mechanical reduction gears which act in accordance with at least two turning radii; an automatic steering radius switching means between the fixed reduction gears (fixed steering radii); a device for the driver inputting a desired steering radius; a control unit which, according to the driver's steering radius input, is switched among a plurality of the fixed steering radii and approximates the desired steering radius.

It can be advantageous if the cross-drive steering transmission has, in addition, a directly infinitely variable steering range for large radii and, depending on preset turning radius, is switched by the control between directly infinitely variable steering range and graduated steering range.

An advantageous embodiment of the cross-drive steering transmission can have, for example, three fixed reduction gears.

It is also advantageous if a microprocessor is provided in the control which, with the aid of a corresponding program, calculates the desired turning radius from a plurality of adjacent, fixed turning radii while adhering to a preset maximum divergence and controls the steering transmission. It is also possible here to effect an optimation relative to a minimum number of switching operations.

It further can be advantageous if the clutches and/or brakes, in the steering transmission, are designed so that the stabilizing clutches can only slip in case of overload.

Also favorable is a cross-drive steering transmission which, for actuating the clutches, uses a speed-dependent basic frequency for the pulse-width modulation in the range of the digital steering. Hereby, a constant switching frequency of the clutches results based on the covered path, that is, the maximum divergence from the theoretical turning course is thus independent of the driving speed.

Also advantageous is a cross-drive steering transmission which provides a slip control of the stabilizing clutches with a disconnection of the steering transmission via the solenoid valves of the radius clutches or with switching to the infinitely variable range of the first radius.

It can likewise be of advantage to provide the cross-drive steering transmission with a disconnection of the steering transmission after a preset period of time has elapsed after the down-shift to the non-slip range.

It is advantageous, in addition, if the cross-drive steering transmission provides a mechanically actuated hydraulic steering control piston which is always passed along and, in case of interruptions in the electronic control, automatically passes over the control, via the steering transmission, to said hydraulic steering control piston. Thereby, a good fitness for use exists (emergency steering range) even in the case of failure of the electronics. It is convenient here if a turning radius jump, occurring when switching to the emergency steering range, is minimized by briefly opening the lock-up clutch.

The cross-drive steering transmission according to the invention is adequate both for a primary (engine side) drive and for a secondary (output side) drive.

We claim:

1. A cross-drive steering transmission, for steering a tracklaying vehicle, comprising:

at least two mechanical reduction gears providing at least two fixed steering radii;

a device for a driver to input a desired steering radius to an electronic control regulating the steering transmission;

the electronic control operating in a digital mode to automatically switch among the at least two mechanical reduction gears to adjust the steering transmission to approximate the desired steering radius; and wherein the electronic control comprises a microprocessor incorporating a program to calculate an approximation of the desired steering radius using a plurality of intersecting arc segments defined by the said at least two fixed steering radii and based on a preset maximum allowable divergence between the fixed steering radii and the desired steering radius; and wherein said steering transmission is controlled via a clutch which is operated with controlled slippage to provide an infinitely variable steering range for large steering radii with the electronic control operating in an analog mode, the electronic control operating in the analog mode for relatively large steering radii and in the digital mode for relatively small radii.

* * * * *